March 14, 1939. L. E. PERRINE 2,150,456
VARIABLE SPEED DRIVE
Original Filed Nov. 22, 1933
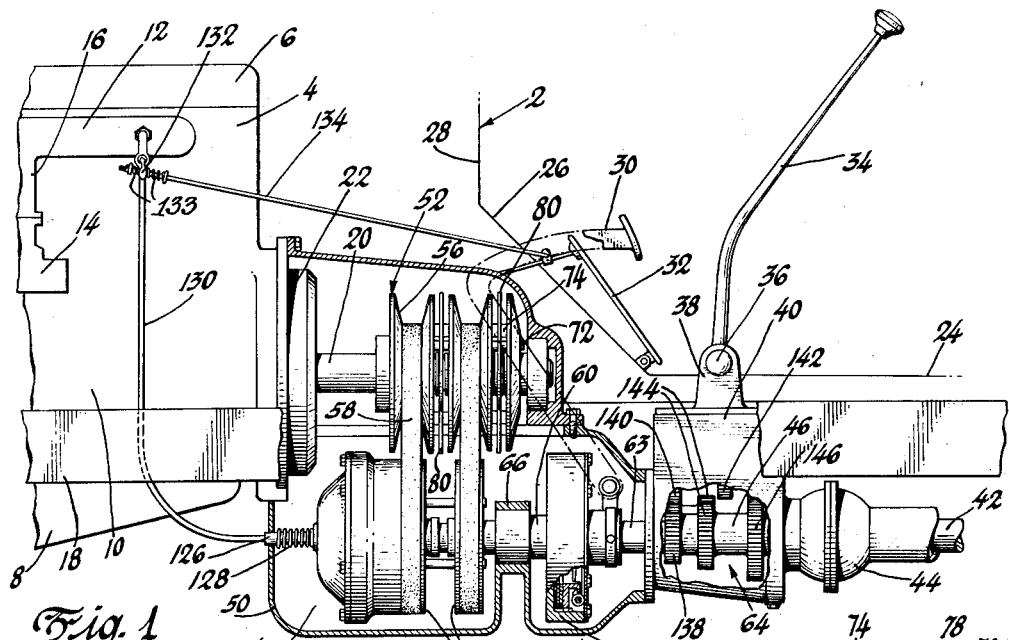
Fig. 1
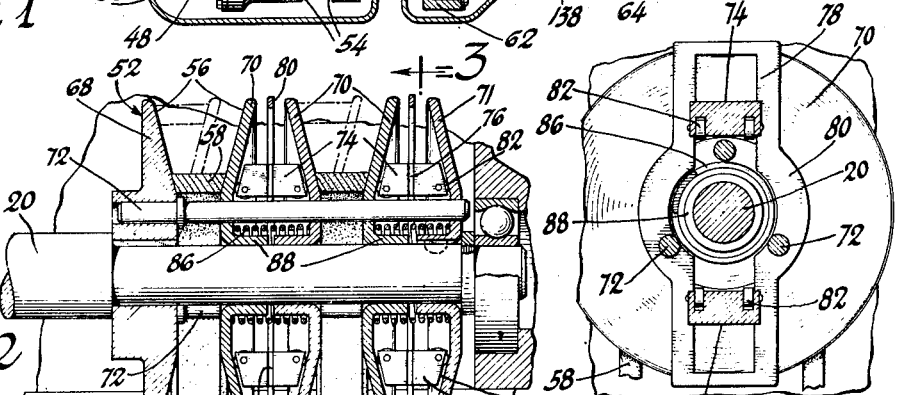
Fig. 2
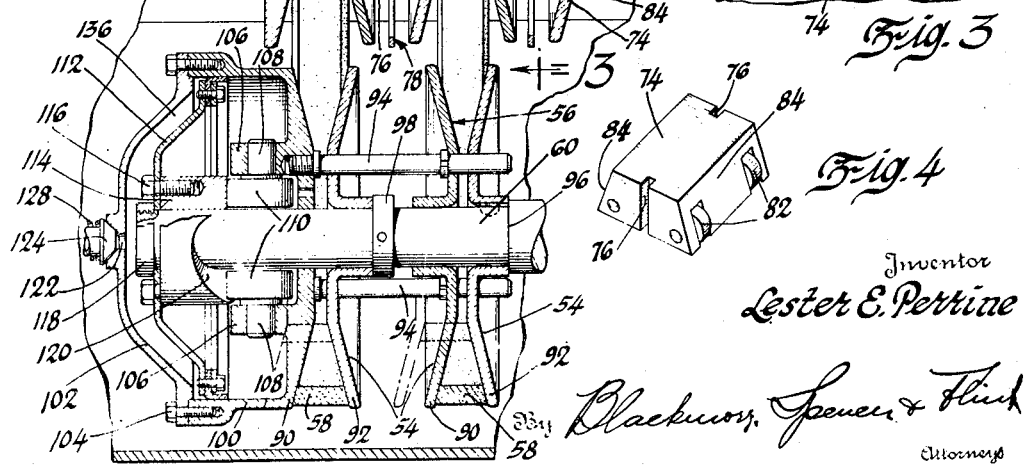
Fig. 3
Fig. 4
Inventor
Lester E. Perrine
Blackmore, Spencer & Flint
Attorneys Patented Mar. 14, 1939

2,150,456

UNITED STATES PATENT OFFICE 2,150,456

VARIABLE SPEED DRIVE

Lester E. Perrine, Detroit, Mich., assignor to General Motors Corporation, Detroit, Mich., a corporation of Delaware Original application November 22, 1933, Serial No. 699,155. Divided and this application September 29, 1934, Serial No. 746,205

23 Claims. (Cl. 74—472)

This invention relates to variable speed drives and is a division of application S. N. 699,155, filed November 22, 1933.

In the practicable embodiment of the invention, use is made of a plurality of expandible and contractible cone pulleys which have a V-belt driving the one pulley from the other. The pulleys are so constructed that as one expands the other will contract, this expansion and contraction taking place without the intervention of manual or other outside means, so that the belt tension is maintained. This expansion and contraction of the pulleys, of course, will cause the V-belt to work on different pitch diameters and produce changes in relative speeds of the two shafts on which the pulleys are mounted. The drive has the combination of a torque loader on one pulley and a spring or other compensator on the other. The purpose of this combination is to enable the torque loader positively to dominate at greater torque, and the compensator to control at greater speeds.

A practical adaptation of the invention is in connection with transmissions of automotive vehicles. In an installation of this type, there would be a plurality of driving and a plurality of driven pulleys for transmission. The number of pairs of pulleys will depend upon the pulley sizes, the sizes of the belts, and the weight of the vehicle to be propelled. Where small belts and small pulleys are used, five or six may be necessary for a small vehicle. Each of the pulleys on the driving shaft may have one non-shiftable side and one shiftable side, or optionally, the endmost pulley sides only may be stationary. On the driving shaft between each pair of pulleys there is mounted one or more centrifugal weights which move outwardly of the pulleys to force the shiftable side toward the non-shiftable side to cause the pulley to contract to force the belt outward to work on a larger pulley diameter and drive the belt faster. The degree to which the centrifugal weights move outward to contract the pulley depends on the speed of the shaft on which the pulleys are mounted. The greater the speed, the more the weights contract the pulleys. Simultaneously with the contraction of the pulleys on the driving shaft the belt will cause the pulleys on the driven shaft to expand to give a smaller diameter on which the belt operates to cause the driven shaft to rotate faster.

The simultaneous contraction of the driving pulley and expansion of the driven pulley will cause a change in speed of the driven shaft to cause the vehicle to move faster.

A pneumatically operated cylinder connected with the driven shaft and operated from the intake manifold of the engine as a fluid pressure servo will cause the contraction of the pulleys on the driven shaft when the accelerator pedal is released. The purpose of this contraction is to put the speed drive mechanism in a position where the greatest amount of torque will be available at starting.

On the drawing:

Figure 1 is a view of a portion of an automotive vehicle with the side of the transmission casing removed showing the application of the invention to an automotive vehicle.

Figure 2 is an enlarged sectional detailed view of the structure of Figure 1 showing in dotted lines a second position of the pulleys and belt.

Figure 3 is a view on the line 3—3 of Figure 2.

Figure 4 is a perspective view of one of the centrifugal weights of Figures 1, 2 and 3.

Referring to the drawing, the numeral 2 indicates an automotive vehicle as a whole. The vehicle has the usual internal combustion engine 4 having the cylinder head 6, the oil pan 8, crankcase 10, intake manifold 12, carburetor 14, and riser 16. The engine 4 is mounted in the usual chassis frame 18 and drives the shaft 20 having a flywheel 22 attached thereto. The floor of the vehicle is indicated at 24, the toe board at 26, and the dash board at 28. The clutch pedal is indicated at 30, the accelerator pedal at 32, and a gearshift lever at 34. The gearshift lever is swivelled at 36 to the dome 38 secured to a transmission housing 40. The propeller shaft of the vehicle is indicated at 42 and is connected by the universal joint 44 to the shaft 46 in the transmission housing 40. The parts so far described are conventional, and per se form no part of the invention.

The transmission or variable speed drive of the invention is indicated as a whole at 48 and is shown as housed in the transmission casing 50. The variable speed drive comprises a plurality of driving pulleys 52 and the plurality of driven pulleys 54. The pulleys have inner conical side faces 56 and V-belts 58 are entrained around the pulleys and through frictional engagement of its sides drives the driven pulleys 54 from the driving pulleys 52. The driving pulleys 52 are mounted on the shaft 20 and driven pulleys 54 are mounted on a driven shaft 60 which has a conventional clutch 62 which connects it with a shaft 63 of a special type of transmission 64 in the transmission housing 40. The shaft 60 is mounted in the bearing 66 in the transmission housing 50 as shown in Figure 1.

Referring to Figure 2, it will be noted that the driving pulleys 52 have a non-shiftable end side 68, movable sides 70, and a non-shiftable end member 71. A plurality of pins 72, preferably three in number, are rigidly secured to the non-shiftable side 68 and extend through circumferentially curved slots in all of the sides 68, 70 and 71 so that the pulley sides are required to move in unison. The shiftable sides 70 of the pulleys are freely mounted on the shaft 20 while the non-shiftable side 68 and the end member 71 are secured to the shaft and compelled to move therewith.

Between the adjoining pulleys there are mounted a plurality of centrifugal weights 74 having lateral grooves 76. In the grooves there are received the sides 78 of the weight guiding and retaining frames 80 mounted between the adjacent pulleys and held in position by the pins 72. The weights 74 have the rollers 82 in their sides to reduce friction and have inclined sides 84 to correspond to the inclined sides of the cone pulleys 52. Compression coil springs 86 are positioned on the hub flanges 88 of the cone pulleys and constantly urge the shiftable sides 70 toward positions effective to contract the axial width of the pulleys 52, thereby increasing the effective diameter of the pulleys by forcing the belt 58 outwardly of the pulleys. It should be observed that the belts 58 being of finite length, no increase in diameter on cheeks 68—70 can take place without a proportional decrease in diameter on cheeks 90—92. Considering the structure of Figure 2, it will be apparent that as the speed of the shaft 20 increases, the centrifugal force will throw the weights 74 outward to force the pulley sides (which confine the centrifugal weight) toward the adjacent pulley sides or to contract the pulleys so that the belt will be forced outward to work on the larger diameter and thereby to drive the belt faster. Belts 58 are so dimensioned with respect to the centers of shafts 20 and 60, and the diameters of the pulleys, that initial load torque overcomes springs 86, to establish low speed ratio.

Considering now the driven pulleys 54, each has a shiftable side 90 and a non-shiftable side 92. Three pins 94 pass through all of the pulley sides to compel them to move in unison. A shoulder 96 and the collar 98 on the shaft 60 limit the movement of the pulley sides 92 toward the right, when considering Figure 2. All of the pulley sides 90 are freely and slidably mounted on a shaft 60 so that some means is necessary to connect the pulleys to the shaft to drive the same.

The pulley side 90 to the left has formed integral therewith a shiftable cylinder 100 closed by a cover 102 secured to the cylinder by the machine screws 104. The pulley side 90 has also formed integral therewith the ears 106 in which there are turnably mounted shafts 108 having the rollers 110 mounted thereon. A stationary piston 112 in the cylinder 100 has a sleeve 114 rigidly secured thereto by the machine screws 116. The sleeve 114 fits over the shaft 60 and may be secured thereto. A collar 118, screw-threaded on the end of the shaft 60, also holds the piston 112 and sleeve 114 on the shaft 60.

The right hand end (Figure 2) of the sleeve 114 is formed into two cams 120 which contact the rollers 110. For the extreme right hand position of the cylinder 100 shown in Figure 2, the rollers are still in contact with the cam faces and as the belts 58 drive the pulleys 54 the cylinder 100 will drive the rollers 110 through the intermediary of the ears 106. The rollers acting against the cams 120 will rotate the sleeve 114 which is rigidly secured to the shaft 60. Piston 112 and cylinder 100 constitute a fluid pressure motor.

The cover 102 of the cylinder 100 has an opening 122 at its center on the axis of the shaft 60. The outer portion of the opening is conical and forms a seat for a conical nipple 124 slidably mounted at 126 in the transmission housing 50. The spring 128 between the housing and the head of the nipple contantly urges the nipple on the conical seat of the opening 122. A conduit 130 leads from the nipple 124 to the intake manifold 12. A valve 132 interposed in the conduit 130 is connected by a rod 134 to the accelerator pedal 32. This rod 134 passes through an opening in the valve actuating arm and has two coil springs 133 surrounding the rod and bearing against each opposite face of the arm and having their extending ends secured against a rigid disk on the rod whereby the rod 134 may have relative movement for lost motion with respect to the valve arm by compressing either spring. The valve 132 is so arranged that when the accelerator pedal is in released or non-depressed position the valve is opened, but when the accelerator pedal is depressed, the valve is closed and vents the line 130 to the atmosphere.

The cylinder 100 is therefore subject to manifold vacuum when the accelerator pedal is released. The purpose of this construction is to cause the vacuum to operate in the chamber 136 between the cylinder 100 and the piston 112 to cause the cylinder 100 to move to the right (Figure 2) to push the shiftable sides 90 of the driven pulleys 54 towards the non-shiftable sides 92 to cause a contraction of the pulleys and a corresponding increase in effective diameter of the pulleys. The belt will then run to the top of the gorges in the driven pulleys and pull apart or expand the driving pulleys 52 against the force of the springs 86, or in other words, force the shiftable sides of the driving pulleys in a direction to allow the belts to go to the bottom of the gorge. The belt will then be at the bottom of the gorge of the driving pulleys and at the top of the gorge of the driven pulleys, or give a maximum torque such as is desired for starting. The interaction of the torque responsive mechanism 110—120 with the fluid servo mechanism 100—112 is through members 114 and 106, and the further action is transmitted to weights 74 and pulley cheeks 70 through belts 58. When the vacuum causes the cylinder 100 to move to the right to contract the driven pulleys, the rollers 110 will move to the highest part of the faces of the cams 120 on the sleeve 114.

The variable speed drive as applied to an automotive transmission is entirely automatic and needs no manual control. The operation is as follows: At the start, or when the vehicle is standing still, the belts and the pulleys will be substantially in the interrelation as shown in Figure 2. In other words, the belt will be at the bottom of the gorge of the driving pulleys and will be at the top of the gorge of the driven pulleys. This will be in the position of maximum torque and allow a ready starting of the vehicle. At idling and slow speeds the weights 74 have little or no effect, but as the speed of the driving shaft 20 increases, the weights 74 will move outwardly to force the movable driving pulley sides toward the non-movable sides to contract the pulley and thereby force the belt 58 toward the dotted line position (Figure 2), or toward the top of the gorge between the driving pulley sides. When the vehicle is moving, the accelerator pedal is depressed, which will remove the effect of the intake manifold from the cylinder 100, and this removal of the vacuum will allow the ready expansion of the driven pulleys 54. Accordingly, as soon as the driving pulley contracts, the driven pulleys will correspondingly expand to keep the belt tensioned. This mutual expansion and contraction will allow the belt readily to adjust itself to the two pulleys. The contraction of the driving pulleys is caused by the weights 74 and by the springs 86. This contraction of the driving pulleys and expansion of the driven pulleys will result in an overdrive at light loads, i. e., the driven pulleys will rotate faster than the driving pulleys. With heavier loads, the increased torque on the torque loader 110—120 contracts the sliding flanges of the driven pulley by the rollers 110 riding up on the faces 120 to force the movable sides toward the stationary ones, which action is strong enough to overcome the springs 86 and the weights 74 to in turn expand the diameter of the driving pulley thereby establishing positions which give greater torque and greater speed reduction for heavy loads as may be required for acceleration or for hill climbing. As the speed of the car increases, there is less need of the under drive (i. e. the driven pulley rotates slower than the driving pulley) and the centrifugal force of the weights 74 increases until at some predetermined high speed the force of these weights is sufficient to hold the transmission in overdrive.

When the operator of the vehicle desires to stop, such as when a traffic light is reached, he will slow down the engine by taking his foot from the accelerator pedal which opens the vacuum from the intake manifold 12 into the cylinder 136. This vacuum will move the cylinder 100 to the right to cause the contraction of the driven pulley axially and allow the springs 86 to increase the effective diameter of the driving pulley. The small force of the driving pulley weights 74 at low speed is readily overcome by the force of the vacuum cylinder 100 acting through the belts to expand the driving pulley axially. It seems obvious from the foregoing description that the movement of operator-controlled cylinder 100 causes variation of both the speed effect of weights 74 and the torque effect of cam and roller mechanism 110—120 under certain driving circumstances. At high speeds the force of the weights 74 plus the force of the springs 86 hold the driving pulley contracted axially against the action of both the torque loader and the vacuum cylinder as in the case of deceleration of high speed.

Referring to the gear transmission designated generally at 64, it is necessary to utilize such a conventional transmission in order to obtain a reversal of drive and extremely low speeds. This type of conventional transmission is illustrated in a patent to Haynes 826,850 and since its operation is the same as Haynes, no further description will be included.

I claim:

1. In a variable speed drive, a driver-operated control, two pulleys mounted on parallel spaced shafts, each of said pulleys having a shiftable and a non-shiftable side, a belt traveling over said pulleys between said sides, means independent of manual control and operative upon change of speed of one of the pulleys for causing the shiftable side of said one pulley to move toward its non-shiftable side and as a result thereof causing the shiftable side of the other pulley to move away from its non-shiftable side to keep a tension on the belt and produce changes in speed ratio corresponding to changes in the effective diameters of the pulleys, said movement of the shiftable pulley sides occurring substantially simultaneously, fluid pressure servo control means arranged to be operated according to movements of said control and fluid motor means controlled thereby and operatively interrelated with one of the pulleys to effect movement of the shiftable side thereof to change the speed ratio.

2. In a variable speed drive, a driver-operated control, two pulleys mounted on parallel spaced shafts, each of said pulleys having a shiftable and a non-shiftable side, a belt traveling over said pulleys between said sides, means independent of manual control and operative upon change of speeds of one of the pulleys for causing the shiftable side of said pulley to move toward its non-shiftable side and as a result thereof causing the shiftable side of the other pulley to move away from its non-shiftable side to keep a constant tension on the belt and produce changes in speed ratio corresponding to changes in effective diameters of the pulleys, said movement of the shiftable pulley sides occurring substantially simultaneously and said means including centrifugally operated means operatively connected with one of the pulleys, and fluid servo operated means controlled by said driver-operated control and operatively interrelated with the other pulley to effect movement of the shiftable side thereof to change the speed ratio.

3. In a variable speed drive for an automotive vehicle having an engine and a propeller shaft, a plurality of expandible and contractible cone pulleys mounted on a shaft driven from the engine, a second plurality of expandible and contractible cone pulleys mounted on a shaft parallel with the engine drive shaft, a clutch connecting said last named shaft to the propeller shaft, a plurality of V-belts entrained over the pulleys between their two shafts, means on the first-named plurality of pulleys operative upon an increase in speed of the engine driven shaft to cause the pulleys to contract to cause the belt to work on a larger diameter to cause an increase in speed of the propeller shaft and torque responsive means on the second named pulleys to cause them to contract on an increase in load on the propeller shaft.

4. In a variable speed drive for an automotive vehicle having an accelerator pedal and a propeller shaft, a plurality of expandible and contractible cone pulleys mounted on a shaft driven from the engine, a second plurality of expandible and contractible cone pulleys mounted on a shaft parallel with the engine driven shaft, a clutch connecting said last-named shaft to the propeller shaft, a plurality of V-belts entrained over the pulleys between their two shafts, means on the first-named plurality of pulleys operative upon an increase of speed of the engine driven shaft to cause the pulleys to contract to cause the belt to work on a larger diameter to cause an increase in speed of the propeller shaft, and vacuum operated means operable upon the release of the accelerator pedal to cause a contraction of the driven pulleys to return the speed drive to starting position.

5. In a variable speed drive for an automotive vehicle having an accelerator pedal and a propeller shaft, a plurality of expandible and contractible cone pulleys mounted on a shaft driven from the engine, a second plurality of expandible and contractible cone pulleys mounted on a shaft parallel with the engine driven shaft, a clutch connecting said last-named shaft to the propeller shaft, a plurality of V-belts entrained over the pulleys between their two shafts, and means on the first-named plurality of pulleys operative upon an increase in speed of the engine driven shaft to cause the pulleys to contract to cause the belt to work on a larger diameter to cause an increase in speed of the propeller shaft, a piston and cylinder interrelated with the second-named expandible pulleys to contract the pulleys when the accelerator pedal is released to force the belt to work on a larger diameter, and a conduit leading to the induction system of the engine to operate the piston and cylinder when the accelerator pedal is released only.

6. In a variable speed drive for an automotive vehicle having a motor with an intake manifold, an accelerator pedal and a propeller shaft, a multiple belt automatically variable speed pulley transmission between a motor driven shaft and the propeller shaft, a vacuum means to control the operation of the transmission, means connecting the last mentioned means to the intake manifold which supplies the vacuum and a valve in the connecting means operated by the accelerator pedal to control the vacuum supply to the transmission.

7. In a variable speed drive for an automotive vehicle, a motor shaft, a multiple belt variable speed friction transmission connected thereto, a clutch connected to the output of the transmission, a gear box connected to the clutch output, a propeller shaft extending from the gear box to drive the vehicle, and vacuum controlled means to vary the ratio of the transmission.

8. In a variable speed drive for an automotive vehicle having a motor with an intake manifold and an accelerator pedal, a motor drive shaft having a plurality of expandible and contractible pulleys, a driven shaft also having a plurality of similar pulleys, V-belts entrained over the pulleys between the two shafts, vacuum actuated means to contract the pulleys on the driven shaft, a supply conduit for said vacuum means from the intake manifold, and control means for the conduit operated by the accelerator pedal whereby when the pedal is released vacuum will be applied to contract the driven pulleys and cause a high torque position to be assumed by the transmission.

9. An engine having an intake suction means, an engine drive shaft, a propeller shaft, a variable speed friction transmission between the two shafts including pulleys, said pulleys each having a fixed and a movable side and being mounted on parallel shafts with belts entrained thereon, means in the transmission responsive to engine shaft speed to move the movable side of one pulley toward its fixed side to change the ratio, and means in the transmission responsive to intake suction to move a movable pulley side away from its fixed side to independently vary the ratio of drive.

10. In a variable speed drive, a drive shaft, a driven shaft, a plurality of expandible and contractible pulleys on each shaft, V-belts entrained over said pulleys, speed responsive means on the drive shaft to contract the pulleys and thereby to change the effective diameters of the pulleys, and a torque loader on the driven shaft to contract the pulleys thereon and to independently vary the drive ratio.

11. In a variable speed drive between two shafts, a plurality of expandible and contractible pulleys on each shaft, V-belts entrained over each pair of pulleys, and speed responsive means upon one shaft and a torque loader upon the other independently operable upon the pulley sides to vary the drive ratio under different conditions.

12. In power transmission devices, in combination, an engine, a throttle for said engine, means cooperative with said engine, effective to supply atmospheric or sub-atmospheric pressure connected to a valve, a variable speed transmission embodying one or more ratio changing elements, a vacuum motor controlled by said valve directly operative upon one speed ratio changing element of said transmission mechanism, a connection between said valve and said accelerator pedal effective to shift said speed ratio changing element upon predetermined movement of said pedal by the operator, and a lost motion connection between said valve and said accelerator pedal effective to move said speed ratio changing element upon selective positioning of said pedal by an operator.

13. In combination, an engine, a throttle control for said engine, a continuously variable transmission unit driven by said engine, a main clutch mechanism driven by said transmission, a second transmission unit driven by said clutch and control means for said first named transmission unit responsive to engine speed, throttle position and load torque, control means for said second named transmission unit including a shiftable lever, control means for said main clutch, all of said control means being manually operative by the operator.

14. In combination, a power source, an operator-operable control throttle for said power source, a first variable speed transmission unit, a second variable speed transmission unit, a clutch effective to connect and disconnect said units, manual means to shift the speed ratio of said second transmission unit, manual means to operate said clutch, and automatic speed ratio control means for said first variable speed transmission unit embodying a control element responsive to the positioning of said operator-operable throttle control.

15. In a variable speed drive for an automotive vehicle having an accelerator pedal, a motor shaft, a multiple belt variable speed friction transmission connected thereto, a clutch connected to the output of the transmission, a gear box connected to the clutch output, a propeller shaft extending from the gear box to drive the vehicle, vacuum controlled means to vary the ratio of the transmission, means for supplying vacuum thereto and means for controlling the supply operated by the accelerator pedal.

16. In a variable speed device, a propelling engine, a continuously variable speed transmission driven thereby, a step-ratio transmission driven by the first named transmission, means in the first named transmission operated by coacting speed and torque response to affect the change of ratio thereof automatically and manual means for changing the ratio in the second named transmission whereby the torque responsive effect in said first named transmission may be varied.

17. In a variable speed device, an engine, a continuously variable speed transmission driven thereby, fluid pressure actuating means for the transmission, operator controlling means for the fluid pressure means, speed and torque responsive means in the transmission and coacting automatically to change the ratio thereof, a step-ratio transmission driven by the first named transmission and manual means for operating the second named transmission.

18. In combination, a driving shaft, a load shaft, a variable speed ratio changing transmission connected to and effective to transmit drive between the shafts, said transmission including driving and driven members rotating respectively with said driving and load shafts; a plurality of ratio shift varying means connected to the transmission comprising ratio control mechanism operative at the speed of said driving shaft, further ratio control mechanism responsive to the torque of said load shaft and a fluid pressure responsive means directly controlled by the operator and effective to coact with both said mechanisms, whereby the speed ratio of drive by said transmission is a resultant of input speed response, load torque and manual control.

19. In power transmission systems, in combination, an engine, a throttle control for said engine, variable speed transmission driven by said engine, actuation means arranged to change the ratio of said transmission, including an element responsive to variations in speed and an element responsive to variations in torque operative to shift said actuation means for establishing automatic ratio change of said transmission, and an element responsive to movement of said control effective to cause movement of said first two named elements whereby movement of said control is operative to modify the ratio changing action of said speed and said torque responsive elements, at the will of the operator.

20. In a variable speed drive for an automotive vehicle having a propeller shaft and an engine provided with an intake manifold and an accelerator, a variable speed friction pulley transmission connected between the engine and the propeller shaft, one of the transmission pulleys having a movable element, and fluid pressure means operatively connected to the intake manifold and to said movable element and operative with movement of said accelerator to vary the ratio of the transmission.

21. In combination, an internal combustion engine, a throttle for said engine, a pedal connected to said throttle, a continuously variable transmission driven by said engine and providing a continuous flow of torque, a source of pressure differential supplied by said engine, a pipe connected to said source, a valve associated with said pipe, means within the transmission connected to said pipe and operable by said pressure differential to influence the shift of speed ratio of said transmission, and connecting means between said valve and said pedal operative to vary the speed ratio of said continuously variable transmission at the will of the operator.

22. In variable speed device, a propelling engine, a pair of variable speed transmission units arranged in series and driven by the engine, actuating means for one of said units, a source of pressure differential supplied by said engine and connected to said actuating means, an accelerator pedal for said engine, control means for said actuating means intercepting the connection of said pressure differential thereto, manually operated ratio selecting means for the second of said transmission units, and a connection between said control means and said accelerator pedal effective to vary the speed ratio of said first named unit according to the operator's selected positioning of said accelerator pedal.

23. A variable ratio drive including a driver pulley, a driven pulley, one of said pulleys having a pair of relatively movable flanges, centrifugal means for causing relative movement of said flanges including oppositely directed cone surfaces, and a centrifugal weight between said surfaces having independently movable anti-friction devices in contact with said surfaces.

LESTER E. PERRINE.